(12) United States Patent
Hess (10) Patent No.: US 9,398,354 B2
(45) Date of Patent: Jul. 19, 2016

(54) INTEGRATED ASSEMBLY FOR SWITCHING OPTICAL SIGNALS

(71) Applicant: Xtera Communications, Inc., Allen, TX (US)

(72) Inventor: James A. Hess, McKinney, TX (US)

(73) Assignee: XTERA COMMUNICATIONS, INC., Allen, TX (US)

(*) Notice: Subject to any disclaimer, the term of this patent is extended or adjusted under 35 U.S.C. 154(b) by 176 days.

(21) Appl. No.: 13/772,189

(22) Filed: Feb. 20, 2013

(65) Prior Publication Data

US 2014/0233947 A1  Aug. 21, 2014

(51) Int. Cl.
*H04J 14/00* (2006.01)
*H04B 10/00* (2013.01)
*H04Q 11/00* (2006.01)
*H04L 12/931* (2013.01)

(52) U.S. Cl.
CPC .......... *H04Q 11/0005* (2013.01); *H04L 49/357* (2013.01); *H04Q 2011/0052* (2013.01)

(58) Field of Classification Search
None
See application file for complete search history.

(56) References Cited

U.S. PATENT DOCUMENTS

| | | | | |
|---|---|---|---|---|
| 5,077,727 A * | 12/1991 | Suzuki | ............... | H04Q 11/0478 370/478 |
| 6,606,427 B1 * | 8/2003 | Graves | ................. | G02B 6/3849 385/17 |
| 7,593,607 B2 * | 9/2009 | Beshai | ................. | H04J 14/0241 385/17 |
| 2001/0024305 A1 * | 9/2001 | Nishimoto | ......... | H04Q 11/0005 398/82 |
| 2002/0030867 A1 * | 3/2002 | Iannone | .............. | H04J 14/0295 398/49 |
| 2003/0039014 A1 * | 2/2003 | English | ......................... | 359/163 |
| 2003/0185565 A1 * | 10/2003 | Wang | .................. | H04J 14/0212 398/49 |
| 2006/0039705 A1 * | 2/2006 | Goodwill | ............. | H04B 10/801 398/164 |
| 2009/0154342 A1 | 6/2009 | Oltman et al. | | |
| 2010/0118867 A1 * | 5/2010 | Zang | ....................... | H04L 12/56 370/359 |
| 2011/0116755 A1 * | 5/2011 | Rolston | ................ | G02B 6/4452 385/135 |
| 2012/0141124 A1 * | 6/2012 | Darnell | ................... | H04L 49/40 398/45 |

OTHER PUBLICATIONS

Bouillet et al., Path Routing in Mesh Optical Network, 2007, John Wiley & Sons, Ltd., pp. 6-8.*
International Preliminary Report on Patentability issued for PCT/GB2014/050495 dated Aug. 25, 2015, 8 pgs.

* cited by examiner

*Primary Examiner* — Ken N Vanderpuye
*Assistant Examiner* — Jai Lee (57) ABSTRACT

An integrated assembly for switching optical signals. The integrated assembly includes two subassemblies. For instance, the subassemblies might be a shelf assembly and the integrated assembly might be a rack assembly in which the shelf assemblies are connected. Each of the subassemblies includes optical interfaces configured to support communication of optical channels to and from the integrated assembly using the corresponding subassembly. Each subassembly might also include multiple switch fabric assemblies each including a switching mechanism. An inter-subassembly communication interface is provided between each subassembly. An optical signal may be switched from one of the subassemblies (e.g., one of the shelves) to another even though there is no intervening switching circuitry in between the different subassemblies. Instead, the switching operation is distributed between the subassemblies.

20 Claims, 9 Drawing Sheets

INTEGRATED ASSEMBLY FOR SWITCHING OPTICAL SIGNALS

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optical signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF SUMMARY

At least one embodiment described herein relates to an integrated assembly for switching optical signals. The integrated assembly includes two subassemblies. For instance, the subassemblies might be a shelf assembly and the integrated assembly might be a rack assembly in which the shelf assemblies are connected.

Each of the subassemblies includes optical interfaces configured to support communication of optical channels to and from the integrated assembly using the corresponding subassembly. Each subassembly might also include multiple switch fabric assemblies each including a switching mechanism. An inter-subassembly communication interface is provided between each subassembly.

An optical signal may be switched from one of the subassemblies (e.g., one of the shelves) to another even though there is no intervening switching circuitry in between the different subassemblies. Instead, the switching operation is distributed between the subassemblies themselves (e.g., distributed amongst the shelves). For instance, an optical signal is received at the integrated assembly at one of the subassemblies (e.g., at one of the shelves) and channeled to another subassembly (e.g., to another shelf). Using switching mechanisms in either or both of these subassemblies, the switching occurs so that the optical signal is channeled from the input optical channel to the appropriate output optical channel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Although the principles described herein are not limited to embodiments that have the advantages that will now be described, some embodiments described herein relate to an integrated assembly for switching optical signals. The integrated assembly includes at least two subassemblies. For instance, the subassemblies might be a shelf assembly and the integrated assembly might be a rack assembly into which the shelf assemblies are connected.

Each of the subassemblies includes optical interfaces configured to support communication of optical channels to and from the integrated assembly using the corresponding subassembly. Each subassembly might also include multiple switch fabric assemblies each including a switching mechanism. An inter-subassembly communication interface is provided between each subassembly.

An optical signal may be switched from one of the subassemblies to another even though there is no intervening switching circuitry in between the different assemblies. Instead, the switching operation is distributed between the subassemblies themselves. For instance, an optical signal is received at the integrated assembly over one of the optical channels received by one of the subassemblies. Thereafter, the signal is channeled to another subassembly. Using switching mechanisms in either or both of these subassemblies, the switching occurs so that the optical signal is channeled from the input optical channel to the appropriate output optical channel. Since there is no intervening switching circuitry used to channel the data between subassemblies, the cost of integrated switching assemblies in which optical signals may be switched between subassemblies is reduced compared to having dedicated circuitry to switch the signal between subassemblies.

Figure 1:
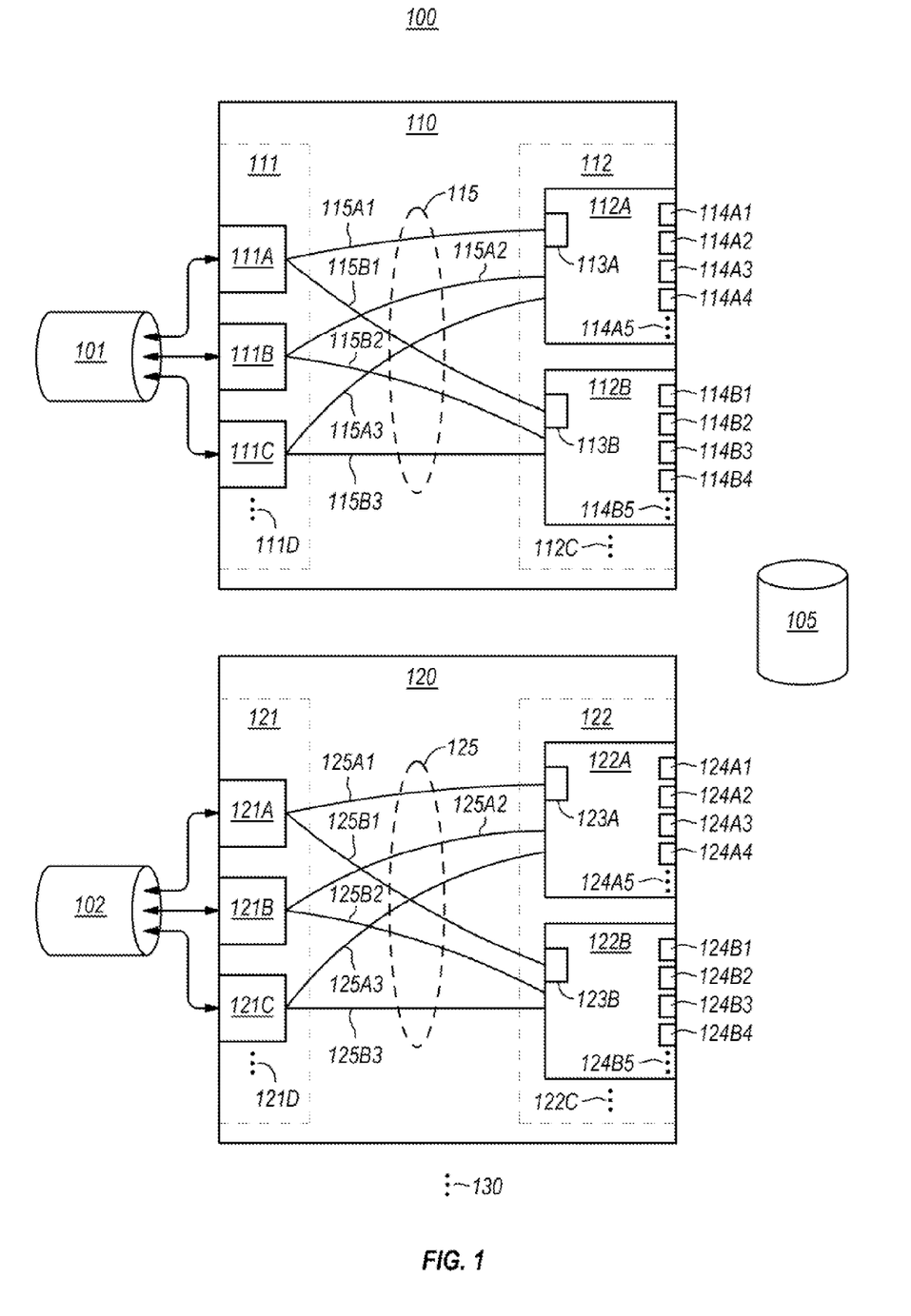
FIG. 1 schematically illustrates an example optical communications system in which the principles described herein may be employed.

FIG. 1 illustrates an integrated assembly 100 (e.g., a rack assembly) for switching optical signals. The integrated assembly 100 includes at least two subassemblies 110 and 120, although the ellipses 130 represent that the integrated subassembly may include any number of subassemblies that may also be configured as described for the first subassembly 110 and the second subassembly 120. FIG. 1 illustrates an abstract representation of an integrated subassembly in accordance with the principles described herein. However, subsequent figures provide more concrete examples of such integrated subassemblies.

In some embodiments, the integrated assembly 100 may be a rack, and each of the subassemblies 110, 120 and 130 are shelves that are connected within the rack. However, the principles described herein are not limited to such a physical configuration. Nevertheless, as this is an advantageous configuration, the integrated subassembly 100 may hereinafter also be referred to as a rack 100, and each of the subassemblies 110, 120 and 130 may also be referred to as a shelf 110, shelf 120 and shelf 130. The same replacement terminology may also be used for the integrated assemblies (e.g., the racks) and the constituent subassemblies (e.g., the constituent shelves) illustrated in subsequent figures.

The first shelf 110 includes optical interfaces 111, which support communication of optical channels 101 to and from the rack 100 using the first shelf 110. In the illustrated embodiment, the optical interfaces 111 are illustrated as including three optical interfaces 111A, 111B and 111C, although the ellipses 111D represent that the principles described herein are not limited to the number of optical interfaces on the first shelf 110, or any of the other shelves for that matter.

The second shelf 120 includes optical interfaces 121, which support communication of optical channels 102 to and from the rack 100 using the second shelf 120. In the illustrated embodiment, the optical interfaces 121 are illustrated as including three optical interfaces 121A, 121B and 121C, although the ellipses 121D again represent that the principles described herein are not limited to the number of optical interfaces on the second shelf 120, or any of the other shelves.

The optical channels 101 and 102 for each of the respective shelves 110 and 120 are abstractly represented. However, one concrete example of a physical medium for communication of such channels are optical fibers or optical fiber groups. Such optical fibers can, in some cases, communicate bi-directionally. However, in most cases, an optical fiber is used for each direction of optical communication. In one embodiment, each of the optical interfaces 111 and 121 may be line cards that are connected to the corresponding shelves 110 and 120.

The first shelf 110 includes switch fabric assemblies 112. In the illustrated case, the first shelf 110 includes two switch fabric assemblies 112A and 112B, although the ellipses 112C represents that the principles described herein are not limited to the number of switch fabric assemblies on any given shelf. Likewise, the second shelf 120 includes switch fabric assemblies 122, including two switch fabric assemblies 122A and 122B, again with ellipses 122C representing that the principles described herein are not limited to the number of switch fabric assemblies on any given shelf. As an example, the switch fabric assemblies 112 and 122 may each be switch fabric cards connected to the corresponding shelves 110 and 120.

Each of the switch fabric assemblies 112 and 122 includes a switching mechanism. For instance, switch fabric assemblies 112A and 112B include respective switching mechanisms 113A and 113B. Likewise, switch fabric assemblies 122A and 122B include respective switching mechanisms 123A and 123B.

Each of the switch fabric assemblies 112 and 122 also includes transceivers that allow for communication with other shelves over an inter-subassembly (or "inter-shelf") communication interface. For instance, the transceivers 114 and 124 can communicate with the opposite shelf over the inter-subassembly (or "inter-shelf") communication interface 105. In each embodiment described herein, the inter-subassembly communication interface 105 does not include a dedicated switch fabric assembly. The transceivers 114 and 124 may be simply electrical connections, in which case the inter-shelf communication interface 105 is simply electrical wiring. On the other hand, the transceivers 114 and 124 may be optical transceivers, in which case the inter-shelf communication interface 105 is optical fibers.

In the illustrated case, each switch fabric assembly 112A, 112B, 122A and 122B is illustrated as including four transceivers. For instance, switch fabric assembly 112A includes transceivers 114A1 through 114A4 (which may collectively be referred to as "transceivers 114A"), switch fabric assembly 112B includes transceivers 114B1 through 114B4 (which may collectively be referred to as "transceivers 114B"), switch fabric assembly 122A includes transceivers 124A1 through 124A4 (which may collectively be referred to as "transceivers 124A"), and switch fabric assembly 122B includes transceivers 124B1 through 124B4 (which may collectively be referred to as "transceivers 124B"). However, the ellipses 114A5, 114B5, 124A5 and 124B5 represent that the principles described herein are not limited to the number of transceivers for any given switch fabric assembly. The transceivers 114A and 114B may also be collectively referred to as "transceivers 114", and the transceivers 124A and 124B may also be collectively referred to as "transceivers 124".

Although not required, in order to make the connections easier to track, the transceivers 114A that are connected to the second shelf 120 might be connected to only transceivers 124A (and vice versa), and transceivers 114B that are connected to the second shelf 120 might be connected to only transceivers 124B (and vice versa).

Each of switch fabric assemblies are coupled to the optical transceivers of the same shelf through electrical connections. For instance, switch fabric assemblies 112 are each connected to each of the optical interfaces 111 using electrical connections 115. Furthermore, switch fabric assemblies 122 are each connected to each of the optical interfaces 121 using electrical connections 125.

More specifically, referring to the first shelf 110, switch fabric assembly 112A is connected to the optical interface 111A via electrical connections 115A1, to the optical interface 111B via electrical connections 115A2, and to the optical interface 111C via electrical connections 115A3. Switch fabric assembly 112B is connected to the optical interface 111A via electrical connections 115B1, to the optical interface 111B via electrical connections 115B2, and to the optical interface 111C via electrical connections 115B3. On the other shelf 120, switch fabric assembly 122A is connected to the optical interface 121A via electrical connections 125A1, to the optical interface 121B via electrical connections 125A2, and to the optical interface 121C via electrical connections 125A3. Switch fabric assembly 122B is connected to the optical interface 121A via electrical connections 125B1, to the optical interface 121B via electrical connections 125B2, and to the optical interface 121C via electrical connections 125B3.

In this environment, the switching operations is performed in a distributed manner across shelves (rather than having dedicated switching circuitry between shelves) by having a portion (called herein a "first portion") of each of the electrical connections 115 and 125 for any given optical interface and switch fabric assembly set being electrically connected to the particular switching mechanism in the switch fabric assembly of that set, and a portion (called herein a "second portion") of the electrical connections being connected through the respective transceivers of the switch fabric assembly to a different shelf.

For instance, one or more of the electrical connections 115A1 may connect the optical interface 111A to the switching mechanism 113A on the switch fabric assembly 112A, and another one or more of the electrical connections 115A may connect signals through to the second shelf 120 via one or more of the transceivers 114A. The same may be said with respect to the other five possible optical interface 111/switch fabric assembly 112 sets on the first shelf 110, and with respect to the six possible optical interface 121/switch fabric assembly 122 sets on the second shelf. Each of the respective switching mechanisms 113A, 113B, 123A and 123B is also communicatively coupled to the opposite shelf (shelf 120 in the case of mechanisms 113A and 113B, and shelf 110 in the case of mechanisms 123A and 123B) via one or more of respective transceivers 114A, 114B, 115A and 115B.

An optical signal received at the integrated assembly 100 (e.g., the "rack 100") at the first subassembly 110 (e.g., the first shelf 110) is switchable to an optical channel emitted from the rack at the first shelf 110 or at the second subassembly (e.g., the "second shelf 120") using the switch fabric assemblies on the first and second shelves and without using a switch fabric assembly outside of the first and second subassemblies.

Figure 2:
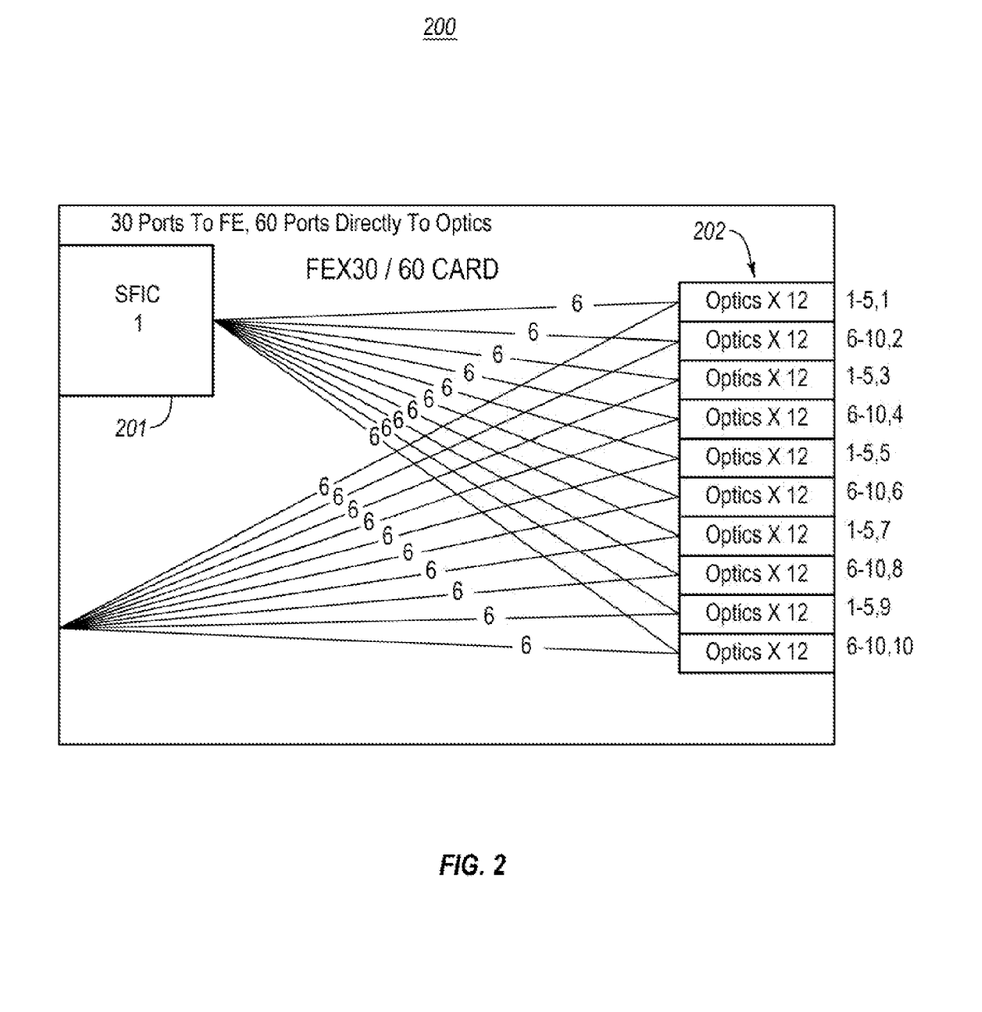
FIG. 2 schematically illustrates a switch fabric assembly in the form of a fabric card.

More concrete embodiments will now be described with respect to subsequent figures. As previously described, each of the switch fabric assemblies 112A, 112B, 122A and 122B, may be a fabric card. FIG. 2 illustrates a schematic of an example fabric card 200. The fabric card 200 is a commercially available FEX 30/60 card, which contains a switching mechanism 201 in the form of a commercially available Switch Fabric IC (called herein "SFIC") circuit. For instance, if the fabric card 200 were the switching fabric assembly 112A of FIG. 1, the switching mechanism 201 might be the switching mechanism 113A. The fabric card 200 also includes ten 12-channel optical channels 202. For instance, if the fabric card were the switching fabric assembly 112A of FIG. 1, the optical channels 202 would represent examples of the transceivers 114A.

The SFIC has a number of connections to the optical interfaces of the corresponding shelf. For instance, suppose that the SFIC has 30 of such connections. These connections are not shown in FIG. 2, but are shown in subsequent figures. As an example, the connections would be optical interfaces 111 in the case of SFIC being the switching mechanism 112 of the corresponding shelf. The SFIC also has a number of connections to the channels 202. For instance, suppose that the SFIC has 60 such connections, 6 for each of the ten 12-channel optical channels 202. There are also 60 connections from the optical interfaces (also called a "backplane"), 6 for each of the ten 12-channel optical channels.

Thus, each bundle of electrical connections from each of the 12-channel optical channels 202 carries 6 connections to the SFIC and 6 connections to the backplane (e.g., to the optical interface of the shelf). The 6 backplane connections are interleaved onto the optical interfaces (e.g., the line cards), so that each carries connections to different line card sets (e.g., either line cards 1-5, or line cards 6-10).

Figure 3:
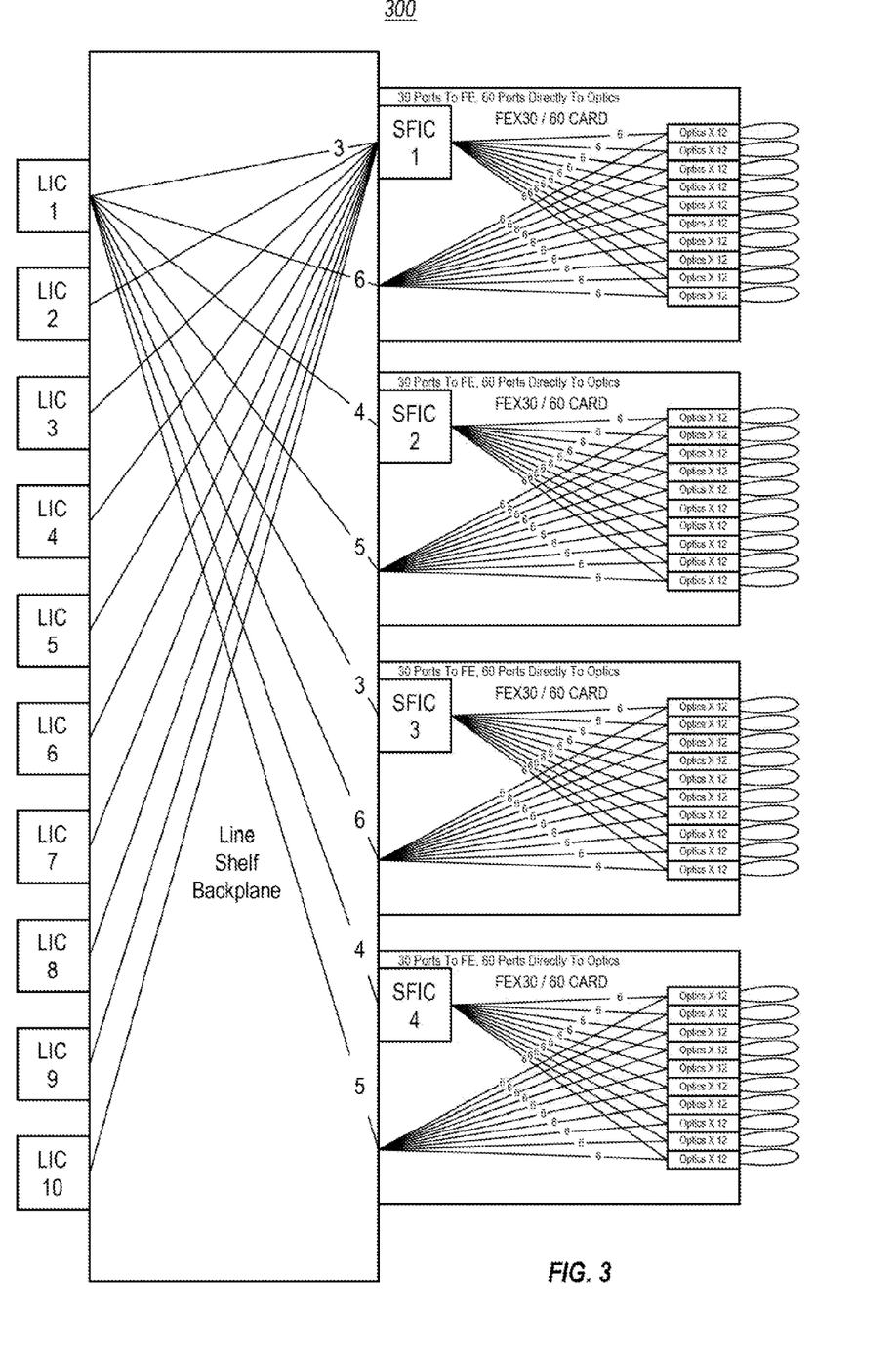
FIG. 3 schematically illustrates an example of an entire subassembly (such as a shelf) constructed using four instances of the fabric card of FIG. 2.

FIG. 3 illustrates an example of an entire subassembly 300 (e.g., the entire shelf) constructed using four instances of the fabric card 200 of FIG. 2. Here, there are 10 optical interfaces shown that are Line Interface Cards, labeled as LIC 1 through LIC 10. Each of these LICs is a line card that represents an example of the optical interfaces of FIG. 1. For instance, if the shelf 300 were the first shelf 110 of FIG. 1, the LICs 1-10 would be examples of the optical interfaces 111. If the shelf 300 were the second shelf 120 of FIG. 1, the LICs 1-10 would be examples of the optical interfaces 121. Each of the FEX 30/60 cards may serve as a switch fabric assembly for the shelf, such as switch fabric assemblies 112 if the shelf 300 is the first shelf 110, or switch fabric assemblies 113 if the shelf 300 is the second shelf. The "line shelf backplane" (also referred to herein as a "host shelf") includes electrical connections such as the electrical connections 115 if the shelf 300 were the first shelf 110, or electrical connections 125 if the shelf 300 were the second shelf 120.

The shelf 300 is actually not an embodiment of the principles described herein, as it is just a single shelf that does not communicate with other shelves. Instead, each of the transceivers (e.g., the 12-channel optical channels) is configured in loop back mode. Thus, signals that are received by a given FEX 30/60 card from a particular LIC card may be received directly (or indirectly via a loop back) by the corresponding SFIC circuit and then channeled back to the appropriate outbound channel on the appropriate LIC directly (or indirectly via a loop-back). The loop backs may even be a fully electrical loop back in which the signal is looped back without converting the signal into an optical signal.

Each of the LICs would have a number of electrical connections to each of the FEX 30/60 cards. However, for the sake of not complicating the diagram too much (and thus obfuscating the core structure), only the electrical connections to and from the LIC 1, and only the electrical connections to and from the upper most FEX 30/60 card, are shown.

Figure 4:
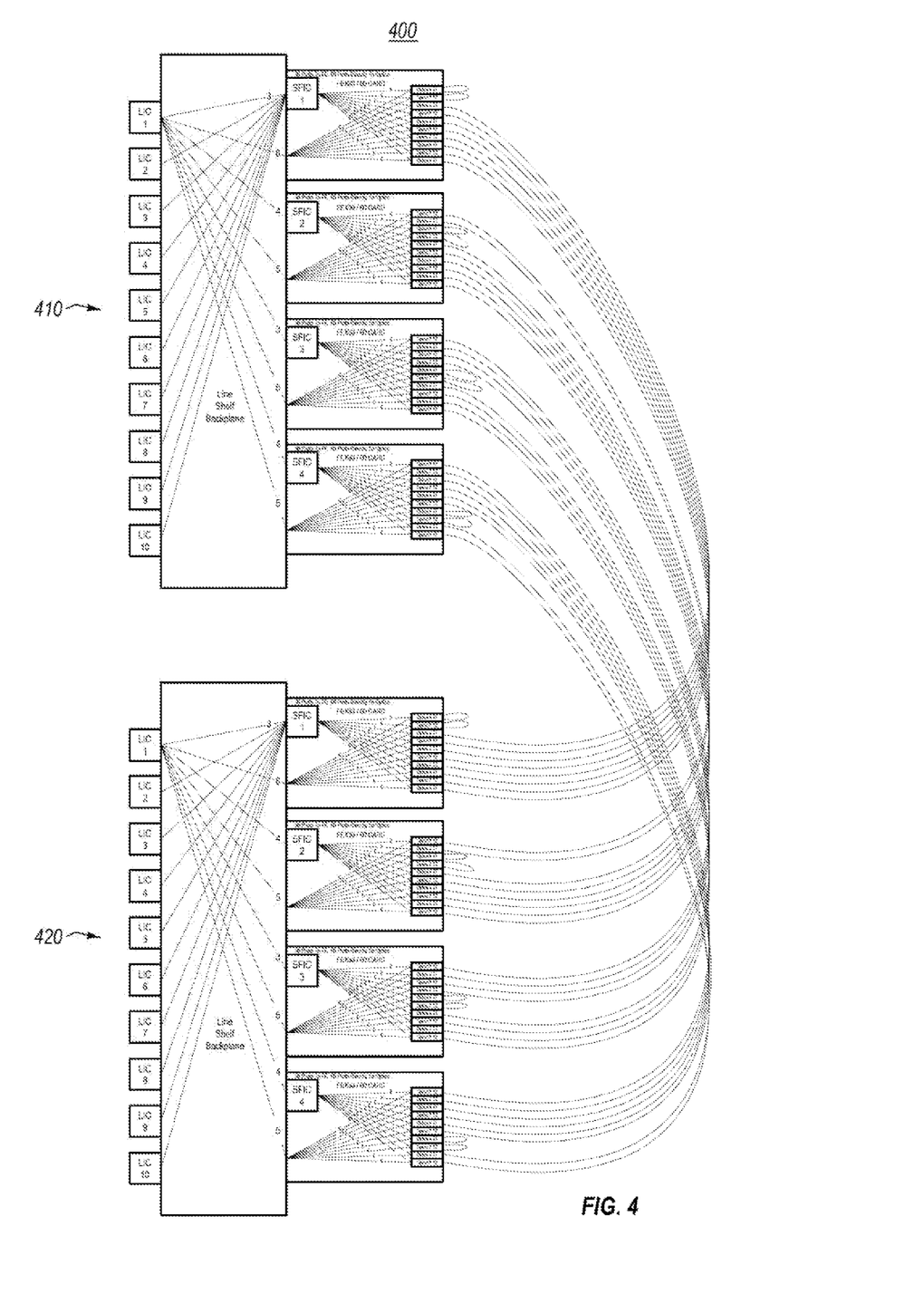
FIG. 4 schematically illustrates an example of an integrated assembly (e.g., a rack) constructed using two of the subassemblies of FIG. 3.

FIG. 4 illustrates an integrated assembly 400 (e.g., "rack 400") that includes two subassemblies 410 and 420 (e.g., two shelves 410 and 420). Here, each of the shelves 410 and 420 is an instance of the shelf 300 of FIG. 3, except for the configuration of the 12-channel optics. All ten of the optics for each of FEX 30/60 cards are populated. Two are looped back, and the other eight are connected to the other shelf. The two looped back optics provide 12 additional connections from the host shelf to the SFIC for a total of 42 connects from the host shelf to each SFIC on the host shelf.

The configuration is asymmetrical. The local (i.e., on the same shelf) line cards have 42 connections to the local SFIC's, but have 48 connections to the remote SFIC's. This provides for 90 connections to each SFIC. This configuration also uses 8 SFIC's. 7 SFIC's with 90 ports can be used to provide 6300 Gbps for embodiments in which each port handles 10 Gbps.

Figure 5:
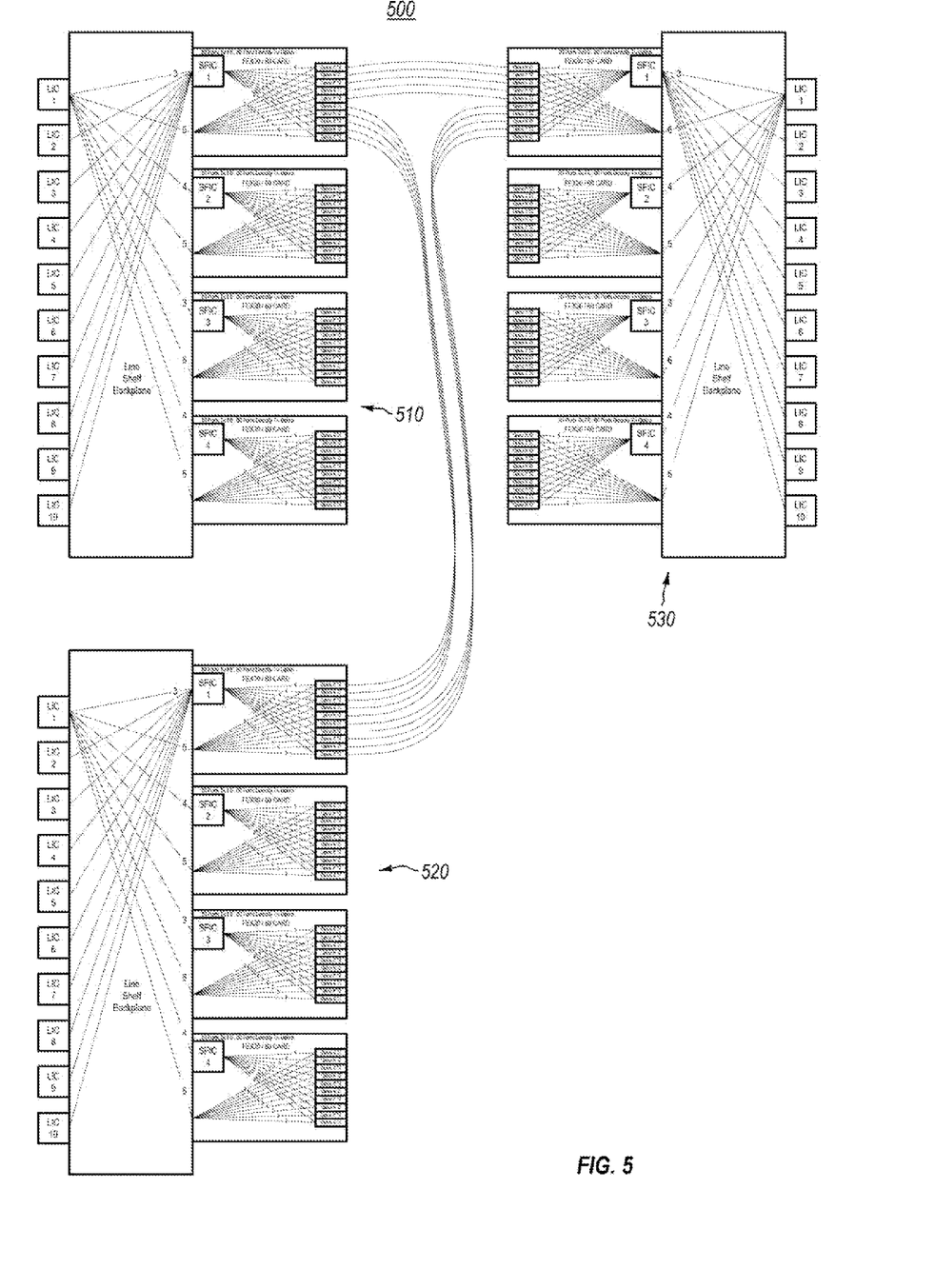
FIG. 5 schematically illustrates an example of an integrated assembly (e.g., a rack) constructed using three of the subassemblies of FIG. 3.

FIG. 5 illustrates an integrated assembly 500 (e.g., "rack 500") that includes three shelves. Here, each of the shelves 510, 520, 530 is an instance of the shelf 300 of FIG. 3, except for the configuration of the 12-channel optics. All ten of the optics for each of FEX 30/60 cards are again populated. Five of the optics go to each of the other two shelves. This configuration provides for 30 connections from each shelf to each SFIC, for a total of 90 connections.

FIG. 5 shows only connections from the uppermost FEX 30/60 on each of the shelves. The other three FEX 30/60's from each shelf will be similarly connected. However, the groups of fibers could preferably change. For instance, in FIG. 5, the top five optics from shelf 510 are connected to the top five optics of shelf 530. This should be the same for the third FEX 30/60 from the top. However, the second and fourth FEX 30/60 should connect the top five optics from shelf 510 to the top five connectors of shelf 520.

Figure 6:
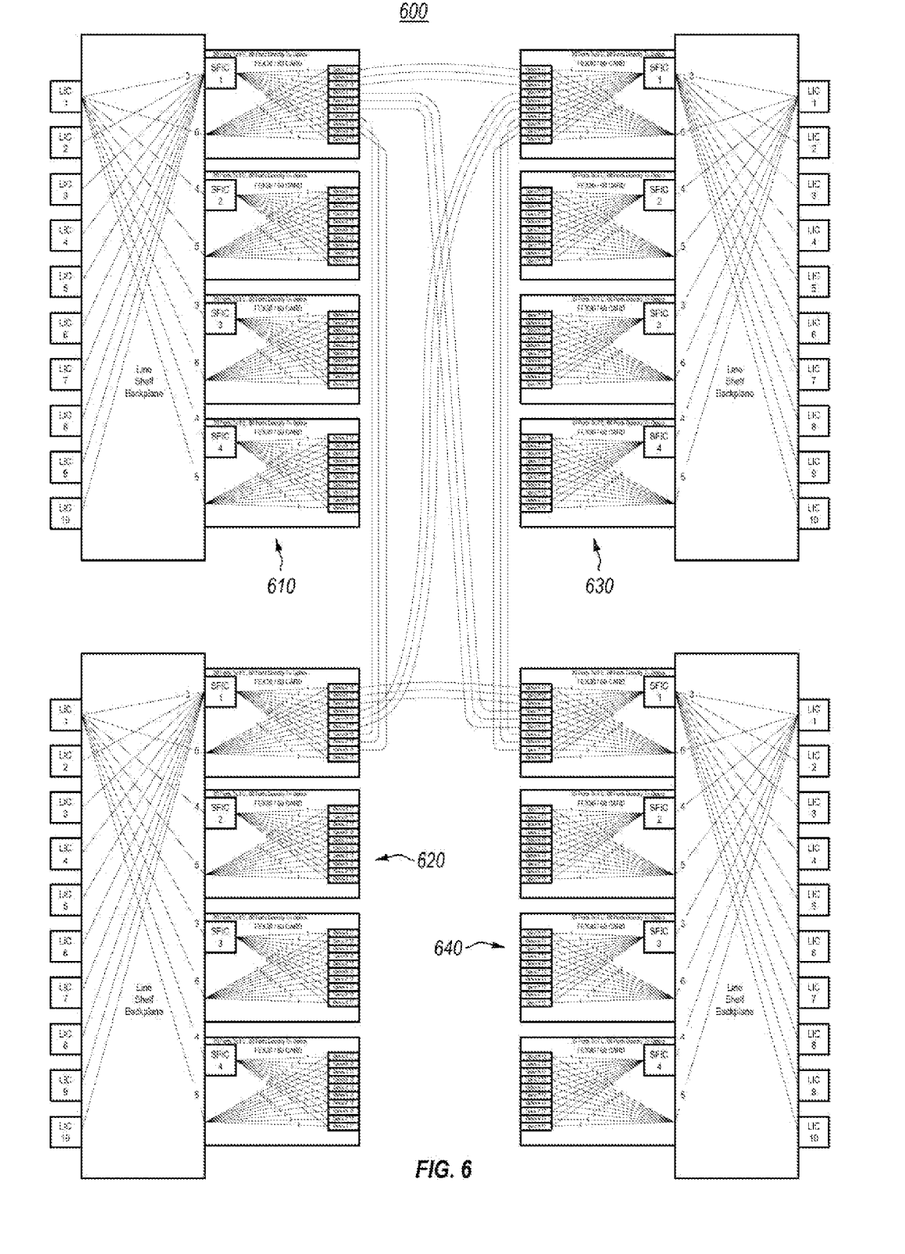
FIG. 6 schematically illustrates an example of an integrated assembly (e.g., a rack) constructed using four of the subassemblies of FIG. 3.

FIG. 6 illustrates a rack 600 that includes four shelves. Each of the shelves 610, 620, 630 and 640 is an instance of the shelf 300 of FIG. 3, except for the configuration of the 12-channel optics. Nine of the ten of the optics for each of FEX 30/60 cards are populated. Three of the optics go to each of the other three shelves. This configuration provides for 18 connections from each shelf to each FEX 30/60 1600, for a total of 72 connections.

FIG. 6 shows only connections from the uppermost FEX 30/60 on each of the shelves. The other three FEX 30/60's from each shelf will be similarly connected. However, the groups of fibers could preferably change. For instance, in FIG. 6, the $10^{th}$ optic of the upper FEX 30/60's remains unused. For the other three FEX 30/60's, a different optical unit could be left unused to even out the line card ports.

Figure 7:
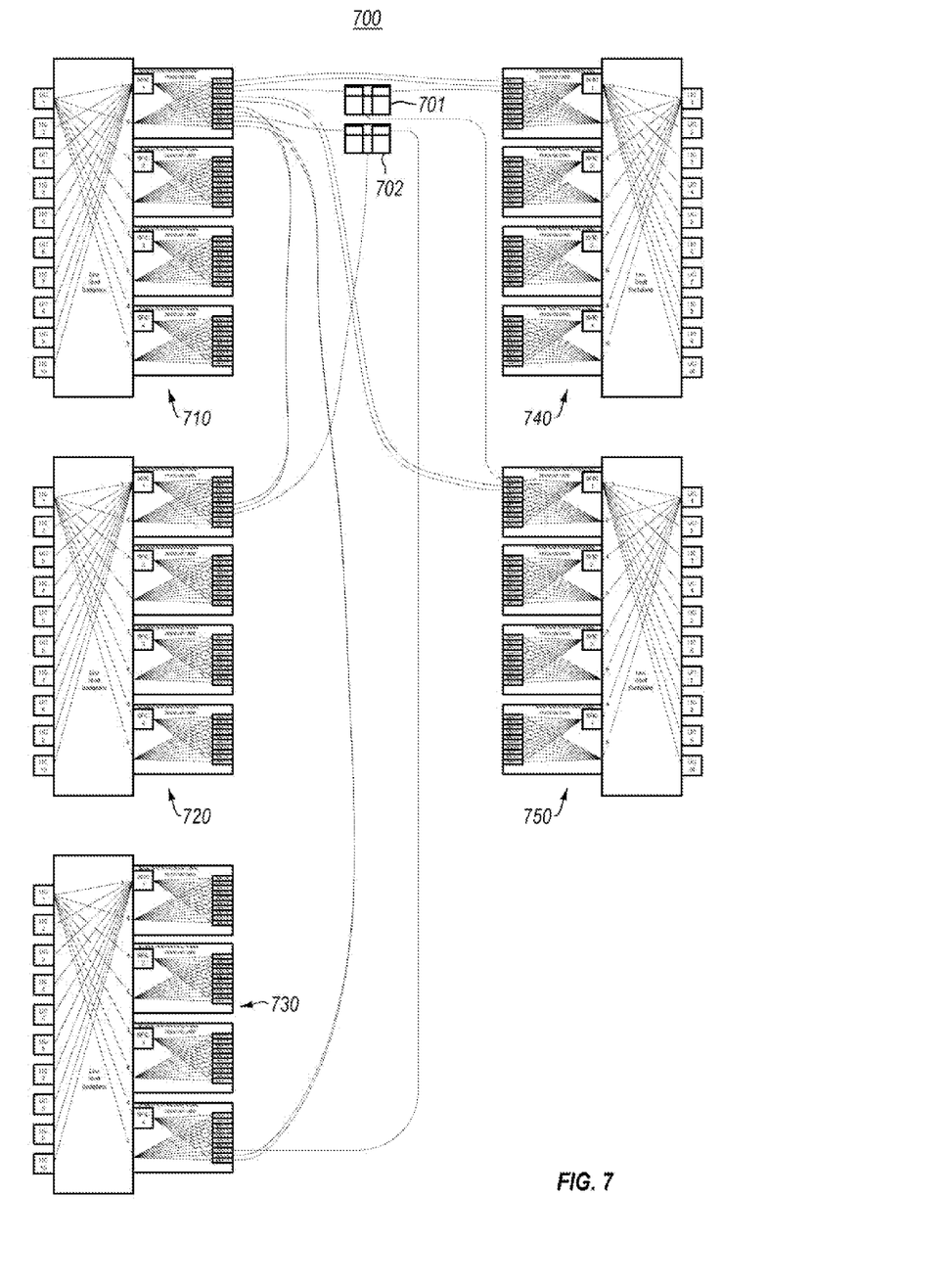
FIG. 7 schematically illustrates an example of an integrated assembly (e.g., a rack) constructed using five of the subassemblies of FIG. 3.

FIG. 7 illustrates a rack 700 that includes five shelves. Each of the shelves 710, 720, 730, 740 and 750 is an instance of the shelf 300 of FIG. 3, except for the configuration of the 12-channel optics. This connection uses 15 connections from each shelf to each SFIC. 15 is not divisible by 6, so there are fiber fanouts 701 and 702 used to connect this configuration. Each fiber fanout 701 and 702 will take 24 channels (12 transmit channels, and 12 receive channels), and split it into two sets of 12 channels (6 transmit channels and 6 receive channels). No switching is actually performed here. All ten of the optics for each of FEX 30/60 cards are populated. 2.5 of the optics go to each of the other four shelves. This configuration provides for 15 connections from each shelf to each FEX 30/60, for a total of 90 connections. Due to the complexity in using fanouts for this configuration, if one is expanding from four shelves in a rack, one might choose to expand directly to six shelves, instead of five.

Figure 8:
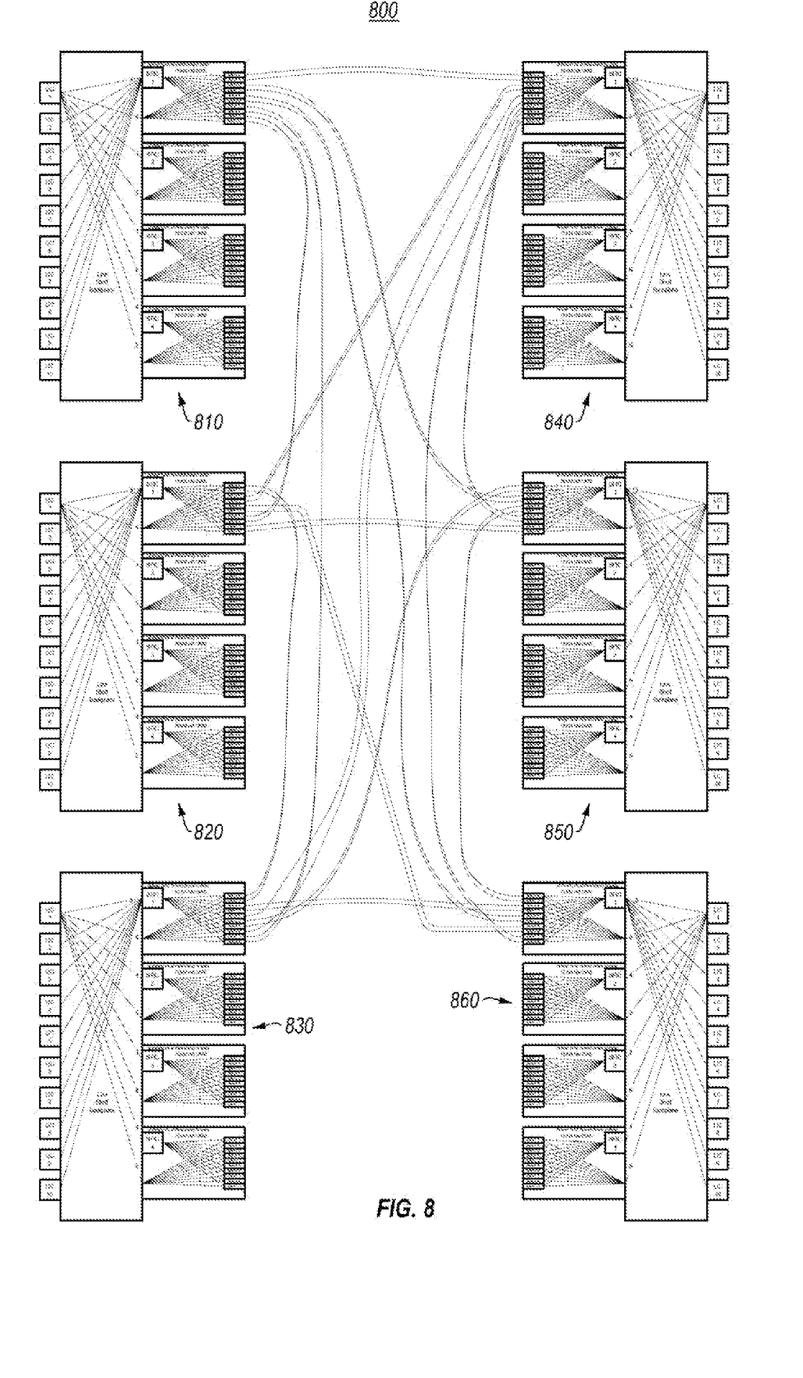
FIG. 8 schematically illustrates an example of an integrated assembly (e.g., a rack) constructed using six of the subassemblies of FIG. 3.

FIG. 8 illustrates a rack 800 that includes six shelves. Each of the shelves 810, 820, 830, 840, 850 and 860 is an instance of the shelf 300 of FIG. 3, except for the configuration of the 12-channel optics. This connection uses 12 connections from each shelf to each FEX 30/60, for a total of 72 connections. All ten of the optics for each of FEX 30/60 cards are populated. Two of the optics go to each of the other five shelves. FIG. 8 shows only connections from the uppermost FEX 30/60 on each of the shelves. The other three FEX 30/60's from each shelf will be similarly connected.

Figure 9:
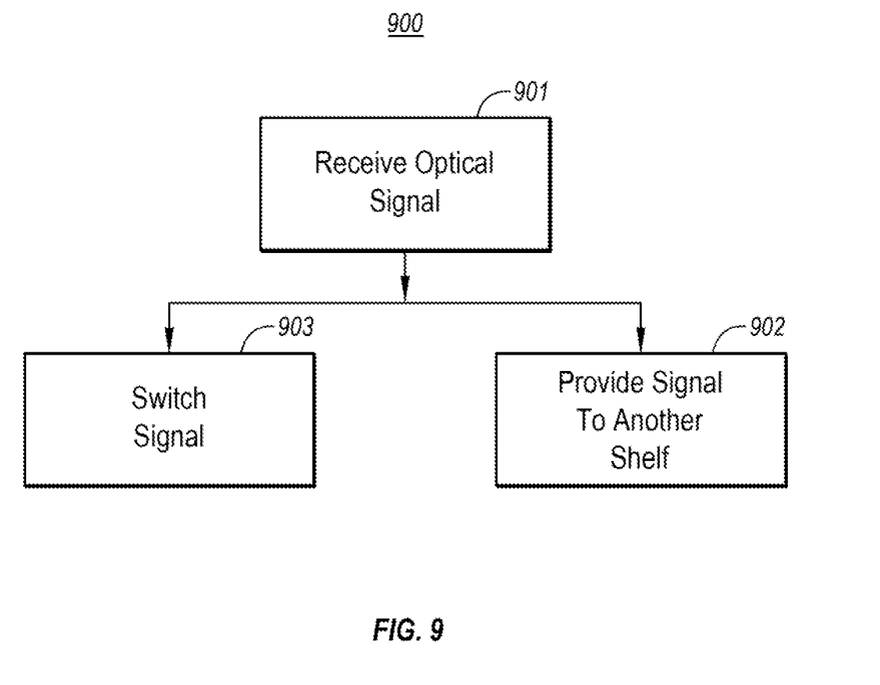
FIG. 9 illustrates a flowchart of a method for switching an optical signal, which may be employed using any of the integrated assemblies of FIGS. 1 and 3 through 9.

FIG. 9 illustrates a flowchart of a method 900 for switching an optical signal, which may be employed using any of the integrated rack assemblies 100, 400, 500, 600, 700 or 800. For clarity, the method 900 will be described with respect to the rack 100 of FIG. 1.

The method 900 is initiated upon receiving an optical signal at a shelf of the rack (act 901). In one embodiment, the optical signal is at Optical Transport Network (OTN) packet. Referring to FIG. 1, suppose, for example, that an optical signal is received at the optical interface 111A. Receiving might also include some demodulation, decapsulation, and/or decoding of the received optical signal.

The method 900 includes an act of providing the signal to another shelf of the rack through an inter-shelf communication interface (act 902). For instance, the first shelf 110 may provide the signal to the second shelf 120 using the communication interface 105.

The method 900 also includes an act of switching the optical signal using one or more switch fabric assemblies in at least one of the first shelf or the second subassembly (act 903). This switching act 903 is shown in parallel with the inter-shelf communication act 902 because the switching might occur before the inter-shelf communication or after the inter-shelf communication. Several examples of such a flow will be provided. In each of the examples, suppose an optical signal is received at optical interface 111A and converted into an electrical packet, and that the electrical connection 115A1 is used to route the electrical packet to the switch fabric assembly 112A.

In a first example, the corresponding electrical packet is received by the switching mechanism 113A either directly from the optical interface 111A or indirectly using a loop back of one of the transceivers (e.g., transceiver 114A1). In that case, the switching mechanism 113A evaluates the destination of the packet, and routes the packet on the appropriate electrical connection that is mapped to the destination. If that destination corresponds to the any of the local optical interfaces 111 on the same shelf 110, the packet is routed onto the appropriate electrical connection on one of the electrical connection sets 115A1, 115A2 or 115A3, to the appropriate optical interface 111A, 111B or 111C for dispatch further towards the destination.

However, if the destination corresponds to an optical interface on another shelf, the switching mechanism determines which electrical connection to route the packet onto, and then dispatches onto that electrical connection. The signal is then routed over inter-shelf communication interface 105 to one of the other transceivers 124A, whereupon it propagates to the appropriate optical interface 121A, 121B or 121C for optical dispatch further towards the destination. In this first example, switching intelligence occurs in the first shelf 110. Other components simply propagate the signals from the optical input to the switching circuit, and from the switching circuit to the optical output.

In a second example, the corresponding electrical packet is not received by the switching mechanism 113A. Instead, the electrical connection immediately propagates the packet to one of the transceivers 114A, for communication of the packet to the second shelf 120, whereupon it is propagated to the switching mechanism 123A. In this case, the switching mechanism 123A evaluates the destination of the packet, and routes the packet on the appropriate electrical connection that is mapped to the destination. If that destination corresponds to the any of the local optical interfaces 121 on the same shelf 120, the packet is routed onto the appropriate electrical connection on one of the electrical connection sets 125A1, 125A2 or 125A3, to the appropriate optical interface 121A, 121B or 121C for dispatch further towards the destination.

However, if the destination corresponds to an optical interface on another shelf, the switching mechanism determines which electrical connection to route the packet onto, and then dispatches onto that electrical connection. The signal is then routed over inter-shelf communication interface 105 to one of the other transceivers 114A, whereupon it propagates to the appropriate optical interface 111A, 111B, or 111C for optical dispatch further towards the destination. In this second example, switching intelligence occurs in the second shelf 120. Other components simply propagate the signals from the optical input to the switching circuit, and from the switching circuit to the optical output.

More generally, in an embodiment in which there are N subassemblies (e.g., N shelves, where N is an integer greater than or equal to two), the optical signal is received at the A'th subassembly, propagated to corresponding signal to the B'th subassembly, which has a switching mechanism that switches the signal, and propagates the switched signal to the C'th subassembly for optical transmission. In this case, "A", "B" and "C" may be any integer equal to or less than N, and may be the same as each other or different than each other. For instance, at least the following scenarios are possible.

1) The signal is received at a given shelf, switched at that same shelf, and dispatched from the same shelf for optical output;

2) The signal is received at a given shelf, switched at that same shelf, and dispatched on a different shelf for optical output;

3) The signal is received at a given shelf, switched at a different shelf, and dispatched for optical output from the same shelf in which the signal was switched;

4) The signal is received at a given shelf, switched at a different shelf, and dispatched for optical output from the same shelf in which the optical signal was received; and 5) The signal is received at a given shelf, switched at a different shelf, and dispatched for optical output from yet another shelf which is neither the shelf into which the optical signal was received, nor the shelf that switched the optical signal.

Regardless, the switching occurs without requiring additional switching circuitry beyond the shelves themselves. Therefore, switching may be more compactly and economically performed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated assembly for switching optical signals, the integrated assembly comprising:
    a first subassembly comprising:
        multiple first optical interfaces configured to support communication of first bidirectional optical channels to and from the integrated assembly using the first subassembly;
        multiple first switch fabric assemblies, each first switch fabric assembly comprising a first switching mechanism and multiple first transceivers; and
        multiple first electrical connections electrically connecting each of the first optical interfaces to the multiple first switch fabric assemblies; and
    a second subassembly comprising:
        multiple second optical interfaces configured to support communication of second bidirectional optical channels to and from the integrated assembly using the second subassembly;
        multiple second switch fabric assemblies, each second switch fabric assembly comprising a second switching mechanism and multiple second transceivers; and
        multiple second electrical connections electrically connecting each of the second optical interfaces to the multiple second switch fabric assemblies;
    wherein:
        a first portion of the first electrical connections electrically connects each of the first optical interfaces to the first switching mechanisms of the multiple first switch fabric assemblies;
        a second portion of the first electrical connections bypasses the first switching mechanisms of the first switch fabric assemblies and electrically connects each of the first optical interfaces to a first subset of the first transceivers of each of the first switch fabric assemblies; and
        the first switching mechanisms of the first switch fabric assemblies are communicatively coupled to the second subassembly through a second subset of the first transceivers of the first switch fabric assemblies.

2. The integrated assembly in accordance with claim 1, wherein:
    the integrated assembly comprises a rack assembly;
    the first subassembly comprises a first shelf assembly connected to the rack assembly; and
    the second subassembly comprises a second shelf assembly connected to the rack assembly.

3. The integrated assembly in accordance with claim 2, wherein:
    the first optical interfaces comprise first line cards connected to the first shelf assembly; and
    the second optical interfaces comprise second line cards connected to the second shelf assembly.

4. The integrated assembly in accordance with claim 3, wherein:
    the first switch fabric assemblies comprise first switch fabric cards coupled to the first shelf assembly; and
    the second switch fabric assemblies comprise second switch fabric cards coupled to the second shelf assembly.

5. The integrated assembly in accordance with claim 2, wherein:
    the first switch fabric assemblies comprise first switch fabric cards coupled to the first shelf assembly; and
    the second switch fabric assemblies comprise second switch fabric cards coupled to the second shelf assembly.

6. The integrated assembly in accordance with claim 1, wherein the first optical interfaces are communicatively coupled to the second subassembly through:
    the second portion of the first electrical connections;
    the first subset of the first transceivers of each of the first switch fabric assemblies;
    the second switching mechanisms of the second switch fabric assemblies; and
    a first subset of the second transceivers of the second switch fabric assemblies.

7. The integrated assembly in accordance with claim 6, wherein the first switching mechanisms of the first switch fabric assemblies are communicatively coupled to the second subassembly through a second subset of the second transceivers of the second switch fabric assemblies.

8. The integrated assembly in accordance with claim 1, wherein:
- a first portion of the second electrical connections electrically connects each of the second optical interfaces to the second switching mechanisms of the multiple second switch fabric assemblies;
- a second portion of the second electrical connections bypasses the second switching mechanisms of the second switch fabric assemblies and electrically connects each of the second optical interfaces to a first subset of the second transceivers of each of the second switch fabric assemblies; and
- the second switching mechanisms of the second switch fabric assemblies are communicatively coupled to the first subassembly through a second subset of the second transceivers of the second switch fabric assemblies.

9. The integrated assembly in accordance with claim 1, wherein the first subassembly comprises at least three first switch fabric assemblies.

10. The integrated assembly in accordance with claim 1, further comprising:
- a third subassembly comprising:
  - multiple third optical interfaces configured to support communication of third bidirectional optical channels to and from the integrated assembly using the third subassembly;
  - multiple third switch fabric assemblies, each third switch fabric assembly comprising a third switching mechanism and multiple third transceivers; and
  - multiple third electrical connections electrically connecting each of the third optical interfaces to the multiple third switch fabric assemblies;
- wherein:
  - a first portion of the third electrical connections electrically connects each of the third optical interfaces to the third switching mechanisms of the multiple third switch fabric assemblies;
  - a second portion of the third electrical connections bypasses the third switching mechanisms of the third switch fabric assemblies and electrically connects each of the third optical interfaces to a first subset of the third transceivers of each of the third switch fabric assemblies; and
  - the third switching mechanisms of the third switch fabric assemblies are communicatively coupled to the first and second subassemblies through a second subset of the third transceivers of the third switch fabric assemblies.

11. The integrated assembly in accordance with claim 10, further comprising:
- a fourth subassembly comprising:
  - multiple fourth optical interfaces configured to support communication of fourth bidirectional optical channels to and from the integrated assembly using the fourth subassembly;
  - multiple fourth switch fabric assemblies, each fourth switch fabric assembly comprising a fourth switching mechanism and multiple fourth transceivers; and
  - multiple fourth electrical connections electrically connecting each of the fourth optical interfaces to the multiple fourth switch fabric assemblies;
- wherein:
  - a first portion of the fourth electrical connections electrically connects each of the fourth optical interfaces to the fourth switching mechanisms of the multiple fourth switch fabric assemblies;
  - a second portion of the fourth electrical connections bypasses the fourth switching mechanisms of the fourth switch fabric assemblies and electrically connects each of the fourth optical interfaces to a first subset of the fourth transceivers of each of the fourth switch fabric assemblies; and
  - the fourth switching mechanisms of the fourth switch fabric assemblies are communicatively coupled to the first, second and third subassemblies through a second subset of the fourth transceivers of the fourth switch fabric assemblies.

12. The integrated assembly in accordance with claim 11, further comprising:
- a fifth subassembly comprising:
  - multiple fifth optical interfaces configured to support communication of fifth bidirectional optical channels to and from the integrated assembly using the fifth subassembly;
  - multiple fifth switch fabric assemblies, each fifth switch fabric assembly comprising a fifth switching mechanism and multiple fifth transceivers; and
  - multiple fifth electrical connections electrically connecting each of the fifth optical interfaces to the multiple fifth switch fabric assemblies;
- wherein:
  - a first portion of the fifth electrical connections electrically connects each of the fifth optical interfaces to the fifth switching mechanisms of the multiple fifth switch fabric assemblies;
  - a second portion of the fifth electrical connections bypasses the fifth switching mechanisms of the fifth switch fabric assemblies and electrically connects each of the fifth optical interfaces to a first subset of the fifth transceivers of each of the fifth switch fabric assemblies; and
  - the fifth switching mechanisms of the fifth switch fabric assemblies are communicatively coupled to the first, second, third and fourth subassemblies through a second subset of the fifth transceivers of the fifth switch fabric assemblies.

13. The integrated assembly in accordance with claim 12, further comprising:
- a sixth subassembly comprising:
  - multiple sixth optical interfaces configured to support communication of sixth bidirectional optical channels to and from the integrated assembly using the sixth subassembly;
  - multiple sixth switch fabric assemblies, each sixth switch fabric assembly comprising a sixth switching mechanism and multiple sixth transceivers; and
  - multiple sixth electrical connections electrically connecting each of the sixth optical interfaces to the multiple sixth switch fabric assemblies;
- wherein:
  - a first portion of the sixth electrical connections electrically connects each of the sixth optical interfaces to the sixth switching mechanisms of the multiple sixth switch fabric assemblies;
  - a second portion of the sixth electrical connections bypasses the sixth switching mechanisms of the sixth switch fabric assemblies and electrically connects each of the sixth optical interfaces to a first subset of the sixth transceivers of each of the sixth switch fabric assemblies; and
  - the sixth switching mechanisms of the sixth switch fabric assemblies are communicatively coupled to the first, second, third, fourth and fifth subassemblies through a second subset of the sixth transceivers of the sixth switch fabric assemblies.

14. A system comprising:
a rack assembly;
a first shelf assembly connected to the rack assembly;
a second shelf assembly connected to the rack assembly; and
an inter-shelf communication interface configured to support communications between the first and second shelf assemblies;
wherein the first shelf assembly comprises:
   multiple first optical interfaces configured to communicate over first bidirectional optical channels;
   multiple first switch fabric assemblies, each first switch fabric assembly comprising a first switching mechanism and multiple first transceivers; and
   multiple first electrical connections electrically connecting each of the first optical interfaces to the multiple first switch fabric assemblies;
wherein the second shelf assembly comprises:
   multiple second optical interfaces configured to communicate over second bidirectional optical channels;
   multiple second switch fabric assemblies, each second switch fabric assembly comprising a second switching mechanism and multiple second transceivers; and
   multiple second electrical connections electrically connecting each of the second optical interfaces to the multiple second switch fabric assemblies; and
wherein:
   a first portion of the first electrical connections electrically connects each of the first optical interfaces to the first switching mechanisms of the multiple first switch fabric assemblies;
   a second portion of the first electrical connections bypasses the first switching mechanisms of the first switch fabric assemblies and electrically connects each of the first optical interfaces to a first subset of the first transceivers of each of the first switch fabric assemblies; and
   the first switching mechanisms of the first switch fabric assemblies are communicatively coupled to the inter-shelf communication interface through a second subset of the first transceivers of the first switch fabric assemblies.

15. The system in accordance with claim 14, wherein:
the first optical interfaces comprise first line cards connected to the first shelf assembly; and
the second optical interfaces comprise second line cards connected to the second shelf assembly.

16. The system in accordance with claim 14, wherein:
the first switch fabric assemblies comprise first switch fabric cards coupled to the first shelf assembly; and
the second switch fabric assemblies comprise second switch fabric cards coupled to the second shelf assembly.

17. The system in accordance with claim 14, wherein the first optical interfaces are communicatively coupled to the second shelf assembly through:
   the second portion of the first electrical connections;
   the first subset of the first transceivers of each of the first switch fabric assemblies;
   the second switching mechanisms of the second switch fabric assemblies; and
   a first subset of the second transceivers of the second switch fabric assemblies.

18. The system in accordance with claim 17, wherein the first switching mechanisms of the first switch fabric assemblies are communicatively coupled to the second shelf assembly through a second subset of the second transceivers of the second switch fabric assemblies.

19. The system in accordance with claim 14, wherein:
   a first portion of the second electrical connections electrically connects each of the second optical interfaces to the second switching mechanisms of the multiple second switch fabric assemblies;
   a second portion of the second electrical connections bypasses the second switching mechanisms of the second switch fabric assemblies and electrically connects each of the second optical interfaces to a first subset of the second transceivers of each of the second switch fabric assemblies; and
   the second switching mechanisms of the second switch fabric assemblies are communicatively coupled to the inter-shelf communication interface through a second subset of the second transceivers of the second switch fabric assemblies.

20. The system in accordance with claim 14, further comprising:
   multiple additional shelf assemblies, each additional shelf assembly comprising multiple additional optical interfaces, multiple additional switch fabric assemblies, and multiple additional electrical connections.

* * * * *